US012793197B2

(12) United States Patent
Laurenzi et al.

(10) Patent No.: US 12,793,197 B2
(45) Date of Patent: Nov. 10, 2026

(54) SYSTEMS AND METHODS FOR AIR POCKET DEFECT DETECTION

(71) Applicant: GlobalWafers Co., Ltd., Hsinchu (TW)

(72) Inventors: Andrea Laurenzi, Novara (IT); Maria Cristina Sanna, Novara (IT)

(73) Assignee: GlobalWafers Co., Ltd., Hsinchu (TW)

( * ) Notice: Subject to any disclaimer, the term of this patent is extended or adjusted under 35 U.S.C. 154(b) by 497 days.

(21) Appl. No.: 18/341,343

(22) Filed: Jun. 26, 2023

(65) Prior Publication Data

US 2024/0428390 A1 Dec. 26, 2024

(51) Int. Cl.
*G06T 7/00* (2017.01)

(52) U.S. Cl.
CPC .. *G06T 7/0004* (2013.01); *G06T 2207/20081* (2013.01); *G06T 2207/20084* (2013.01); *G06T 2207/30148* (2013.01)

(58) Field of Classification Search
CPC ......... G06T 7/0004; G06T 2207/20081; G06T 2207/20084; G06T 2207/30148; C30B 15/20; G06N 3/045; G06N 3/08; G06V 10/84; G06V 10/809; G06V 10/82; G01N 21/9505; H01L 22/12
See application file for complete search history.

(56) References Cited

U.S. PATENT DOCUMENTS 6,725,208 B1 4/2004 Hartman et al.
8,213,707 B2 7/2012 Li et al.
9,317,912 B2 4/2016 Valley
11,238,593 B2 * 2/2022 Turgutlu .................. G06N 3/04
12,299,864 B1 * 5/2025 Takbiriborujeni .... G06T 7/0004
2004/0199481 A1 10/2004 Hartman et al.
2006/0017720 A1 1/2006 Li
2013/0176454 A1 7/2013 Valley
2016/0358041 A1 12/2016 Venkataraman et al.
2017/0357879 A1 * 12/2017 Odaibo ................ A61B 3/0025
2019/0073566 A1 * 3/2019 Brauer .................. G06T 7/0002
2019/0370955 A1 12/2019 Zhang et al.
2021/0117792 A1 4/2021 Ahuja et al.
2021/0158197 A1 5/2021 Costello et al.
(Continued)

FOREIGN PATENT DOCUMENTS

CN 110766660 A 2/2020
CN 111696077 A 9/2020

OTHER PUBLICATIONS

EfficientNet: Rethinking Model Scaling for Convolutional Neural Networks, arXiv:1905.11946v5 [cl.LG] Sep. 11, 2020, pp. 1-11.
(Continued)

*Primary Examiner* — Bobbak Safaipour
(74) *Attorney, Agent, or Firm* — Armstrong Teasdale LLP

(57) ABSTRACT

A computer device includes at least one processor in communication with at least one memory device. The at least one processor is programmed to: a) receive at least one image of a material to be analyzed; b) execute a plurality of models trained to classify the at least one image to detect a first defect type; c) receive from each of the plurality of models a prediction that the at least one image includes the first defect type; d) combine the plurality of predictions to calculate a final prediction of whether or not the at least one image includes the first defect type; and e) reject or approve the material to be analyzed based upon the final prediction.

20 Claims, 7 Drawing Sheets

(56) References Cited

U.S. PATENT DOCUMENTS

| | | | | |
|---|---|---|---|---|
| 2021/0209414 | A1* | 7/2021 | Tang | G06F 18/241 |
| 2022/0328332 | A1* | 10/2022 | Murai | G05B 19/41875 |
| 2022/0374680 | A1* | 11/2022 | Kim | G06N 3/042 |
| 2024/0428390 | A1* | 12/2024 | Laurenzi | G06T 7/0004 |
| 2025/0166162 | A1* | 5/2025 | Shalamberidze | G06T 7/0008 |

OTHER PUBLICATIONS

Chipman, Hugh A. et al, Bayesian Ensemble Learning, pp. 1-8.
International Search Report and Written issued in International Application No. PCT/US2024/035326 mailed on Oct. 8, 2024, pp. 1-27.
Hsu, Chia-Yu et al., Ensemble convolutional neural networks with weighted majority for wafer bin map pattern classification, Journal of Intelligent Manufacturing, 2022, vol. 33., pp. 831-844.

* cited by examiner

SYSTEMS AND METHODS FOR AIR POCKET DEFECT DETECTION

FIELD

The field relates generally to air pocket defect detection, and more specifically to using artificial intelligence analysis of images of for air pocket defect detection.

BACKGROUND

Single crystal ingots, such as silicon ingots, are grown and processed into semiconductor wafers. During processing, one or more tests or inspections may be performed to determine if one or more air pockets (e.g., voids) exist within the ingot, before and/or after slicing into wafers.

Air pockets are gas bubbles present in the silicon melt that may get incorporated into the crystal during the Czochralski (CZ) pulling process. Air pockets or bubbles can be on or near the wafer surface (after slicing of the ingot) or may remain embedded in the wafer. Pocket size can vary from a few microns to a few millimeters depending on their origin.

Detection of air pockets is crucial to manufacture a high-quality semiconductor material since air pockets, both on the wafer surface or embedded inside the wafer can affect performances of devices grown on these wafers. Detection of air pockets as early as possible is needed to avoid further processing of portions of the ingot having the air pocket, because the air pocket may affect the structural integrity of the ingot and/or usefulness of the ingot in one or more products. Detection of air pockets prior to shipment of product wafers may be required to prevent failure of the wafer at some future time, such as during manufacture or processing of a semiconductor or photovoltaic device.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a computer system includes a computing device that may include at least one processor in communication with at least one memory device. The at least one processor may be configured to: a) receive at least one image of a material to be analyzed: b) execute a plurality of models trained to classify the at least one image to detect a first defect type: c) receive from each of the plurality of models a prediction that the at least one image includes the first defect type: d) combine the plurality of predictions to calculate a final prediction of whether or not the at least one image includes the first defect type; and/or e) reject or approve the material to be analyzed based upon the final prediction.

In another aspect, a computer-implemented method may be performed by a computer system including at least one processor in communication with at least one memory device. The method may include: a) receiving at least one image of a material to be analyzed: b) executing a plurality of models trained to classify the at least one image to detect a first defect type: c) receiving from each of the plurality of models a prediction that the at least one image includes the first defect type: d) combining the plurality of predictions to calculate a final prediction of whether or not the at least one image includes the first defect type; and/or e) rejecting or approving the material to be analyzed based upon the final prediction.

In another aspect, at least one non-transitory computer-readable media having computer-executable instructions embodied thereon, when executed by a computing device including at least one processor in communication with at least one memory device, the computer-executable instructions may cause the at least one processor to: a) receive at least one image of a material to be analyzed: b) execute a plurality of models trained to classify the at least one image to detect a first defect type: c) receive from each of the plurality of models a prediction that the at least one image includes the first defect type: d) combine the plurality of predictions to calculate a final prediction of whether or not the at least one image includes the first defect type; and/or e) reject or approve the material to be analyzed based upon the final prediction.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Like reference symbols in the various drawings indicate like elements.

DETAILED DESCRIPTION

Figure 1:
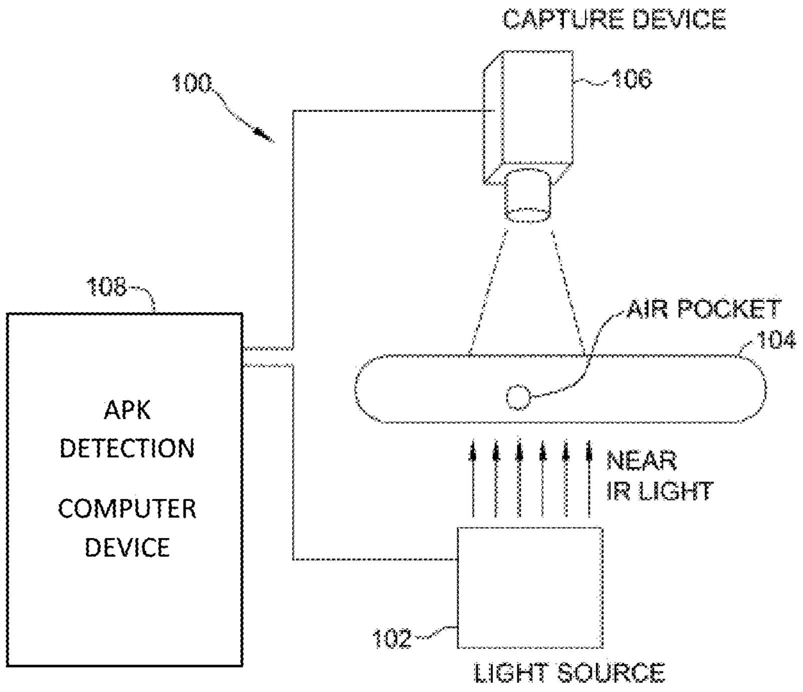
FIG. 1 is a block diagram of an example infrared radiation (IR) detection system.

FIG. 1 is a block diagram of an example infrared radiation (IR) detection system 100. The IR detection system 100 includes a light source 102, such as a near-IR or near-infrared light source, to direct light toward a material 104. The light source 102 is configured to provide light, which defines a wavelength sufficient to penetrate the material 104. In various embodiments, the wavelength of the light from light source 102 (e.g., near-infrared (NIR) light) is selected based on the thickness of the material 104. In one example, the wavelength of the near-IR light emitted from the light source 102 is about 1 to about 2 microns. However, light having one or more different wavelengths can be emitted from light source 102.

On the opposite side of the material 104, the IR detection system 100 includes a capture device 106 configured to capture the light passing through the material 104. In this example, the image capture device 106 is a camera, such as a silicon-based CCD or CMOS array camera. In another example, the capture device 106 includes an InGaAs MOS array camera. Further, one dimensional line-scan or two-dimensional time-delay integration (TDI line-scan) cameras with mechanized scanning may be used to create two-dimensional image arrays, while standard two-dimensional array "snap shot" cameras may also be used. Single capture devices 106 may also be employed, which are used to create two dimensional images using a Nipkow disk or other method to scan an image across a single capture devices or series of discrete capture devices. More generally, a variety of different types of capture devices 106 configured to capture light at the particular wavelength emitted by the light source 102 and transmitted through the material 104 are possible may be used. The capture device 106 generates two-dimensional image data, which is substantially in-focus and representative of light passing through the material 104. The image data may be provided in a single image or multiple images. Multiple images can be provided as multiple image slices of the material 104, at different depths of the material 104, or from different perspectives, such as viewing or illumination angle.

The material 104 may include various different types of materials, such as silicon, germanium, gallium arsenide, or other types of materials formed through a crystalline process. In this embodiment, the single crystal material 104 is a Czochralski (CZ) grown material forming one or more ingot sections, slices, wafers, slugs, slabs, and/or cylinders. The material 104 shown in FIG. 1 is nominally plain parallel, such that the top surface is generally parallel with the bottom surface of the material 104. In other examples, a material may be nearly plain parallel or non-plain parallel, such as cylindrical ingot sections.

In this embodiment, the single crystal material 104 may be subjected to testing at detection system 100 in a variety of conditions, including, for example, potentially doped with various dopants to some level, crude (such as slabs or slugs or after slicing, grinding, lapping or etching), polished (e.g., SSP wafer having front side only polished, back side in various conditions or DSP wafer having both surfaces polished, with front surface potentially final or kiss polished), and/or coated with an epitaxial layer of the same single crystal material except, potentially, a different doping level. Materials 104 may be provided in a variety of thicknesses, such as, for example, from under 1 mm up to about 10's of mm, or other thickness directly from a growing process or after one or more processing steps.

Detection system 100 further includes an air pocket (APK) detection computer device 108. The APK detection computer device 108 is configured to analyze input from the capture device 106. The APK detection computer device 108 can also be configured to control the light source 102.

The term "region of interest" may refer to any image region, including binary image or gray-scale image regions, that includes one or more image objects or blobs. The term "image object" and "blob" may refer to, for example, data units of which at least a portion are being evaluated by the methods and systems described herein. The term "image object" may refer to data units within a grey-scale image, while the term "blob" may refer to data units within a binary image.

Figure 2:
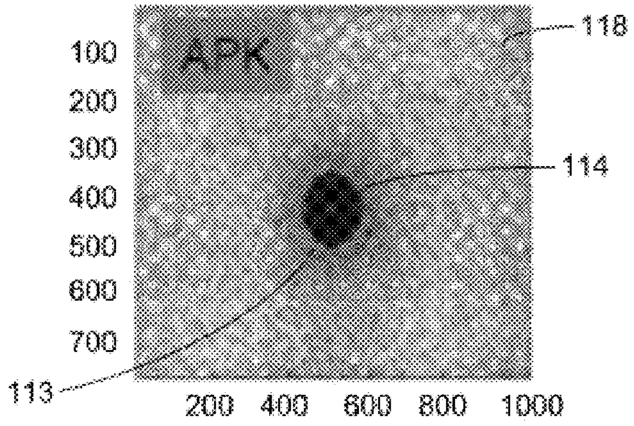
FIG. 2 illustrates image data for a material having an air pocket (APK) anomaly.
Figure 3:
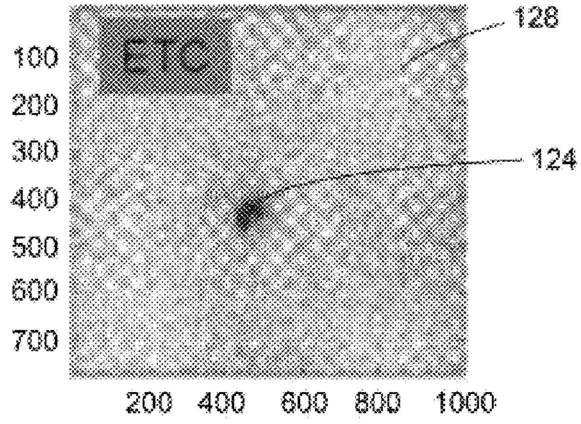
FIG. 3 illustrates image data for a material having a non-APK anomaly.

In use, the single crystal material 104 is positioned between the light source 102 and the capture device 106, such that light from the light source 102 is directed through the material 104, and captured by capture device 106, potentially requiring scanning of the material 104 or the image capture device 106 to produce the captured two-dimensional image array. The image data generated by the capture device 106 is provided to the APK detection computer device 108, which stores the image data in memory. Example image data of materials captured by capture device 106 is illustrated in FIGS. 2 and 3. The systems and methods described herein are provided to process the image data to determine if one or more air pockets are present in the material 104.

The APK detection computer device 108 identifies the anomalies as regions of interest, such as region of interest 114 of FIG. 2, which may contain an air pocket. In at least one embodiment, APK detection computer device 108 may or may not apply one or more initial processes to identify larger, more easily identified air pockets, while other methods herein may be used to identify air pockets and air pocket-like anomalies. For example, larger air pockets or anomalies not resembling air pockets may be identified during imaging of the material 104 by capture device 106, such as a line-scan or TDI line-scan camera. Further, in various embodiments, the APK detection computer device 108 may initially perform one or more other operations on the image data, such as filtering, inverting, or other operation to provide more efficient processing of the image data according to the methods provided herein.

FIG. 2 illustrates image data 118 for a material having an air pocket (APK) anomaly. The image data 118 includes an image object 114. In FIG. 2, the image object 114 is an air pocket anomaly. The air pocket anomaly includes a center point 113 and is substantially round and circular. Because the image object 114 is not perfectly circular with a clean transition from inside to outside of the image object 114, the APK detection computer device 108 (shown in FIG. 1) uses process 400 (shown in FIG. 1) to determine if the image object 114 is an air pocket.

FIG. 3 illustrates image data 128 for a material having a non-APK anomaly. The image data 128 includes an image object 124. In FIG. 3, the image object 124 is an air pocket anomaly. The APK detection computer device 108 (shown in FIG. 1) uses process 400 (shown in FIG. 1) to determine if the image object 124 is an air pocket or other type of anomaly.

Figure 4:
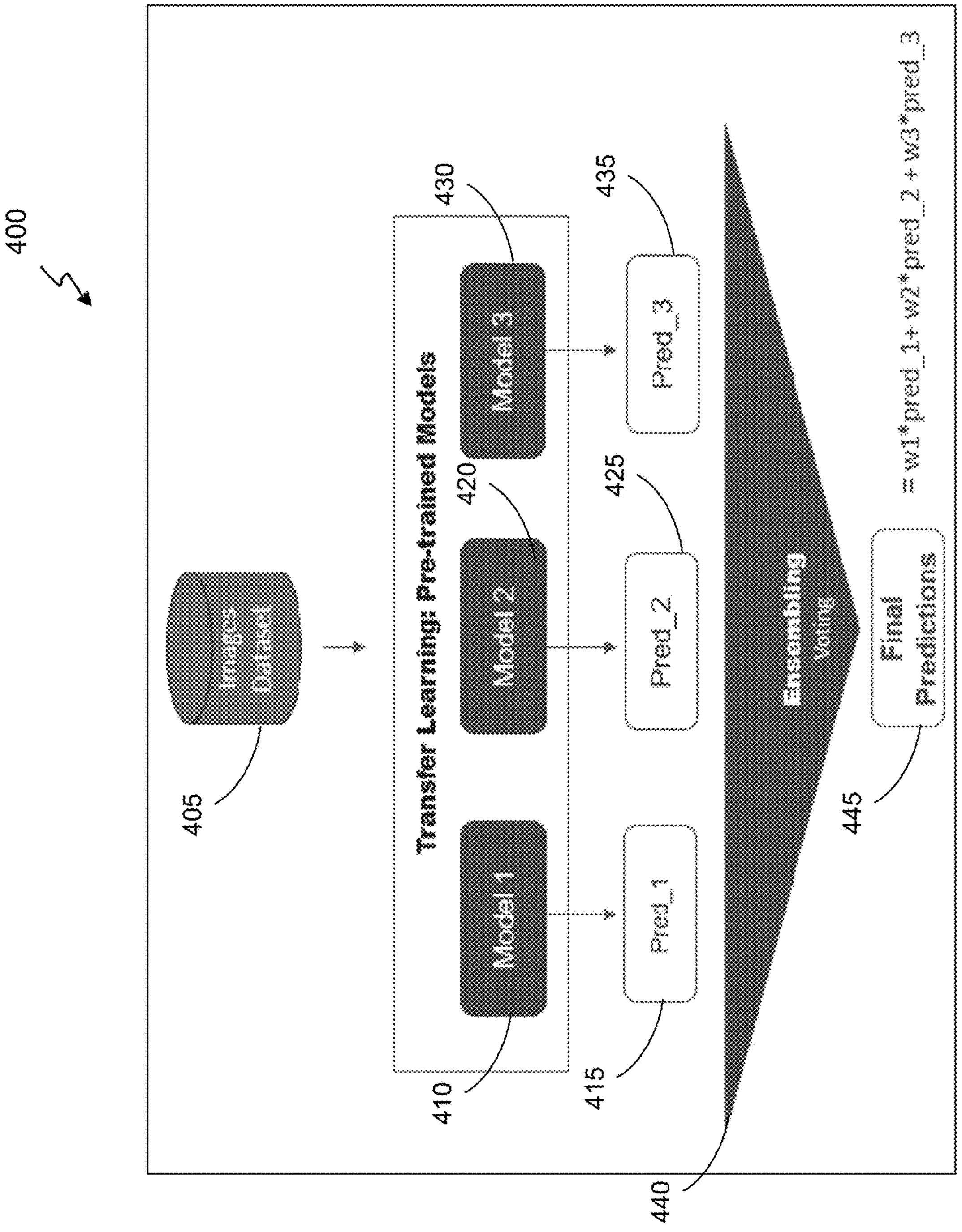
FIG. 4 is a block diagram of the air pocket detection system.

FIG. 4 illustrates an example process 400 of detecting air pockets using the systems 100 and 400 (shown in FIGS. 1 and 4). In one example, the process 400 is performed by the APK detection computer device 108 (shown in FIG. 1).

The APK detection computer device 108 suitably receives a plurality of images 405, also knows as an image dataset 405. The image dataset 405 includes one or more images of a material 104 (shown in FIG. 1) as captured by capture device 106 (shown in FIG. 1).

The APK detection computer device 108 feeds the image dataset 405 into three pre-trained models 410, 420, and 430. The three pre-trained models 410, 420, and 430 are trained with a historical set of images. In the example embodiment, the historical set of images are divided into a training set and a validation set. The APK detection computer device 108 trains three models are trained with the training set and then evaluated with the validation set. In the example embodiment, the three models 410, 420, and 430 are trained to classify the images 405 of silicon for semiconductors to determine if there is an air pocket in the image 405. Each of the three models 410, 420, and 430 is trained to output predictions 415, 425, and 435, respectively. The predictions 415, 425, and 435 are the probability that the image 405 contains an air pocket.

The three models 410, 420, and 430 are suitably executed in parallel. Each of the three models 410, 420, and 430 are executed with the same input image to provide their respective predictions 415, 425, and 435 as outputs.

The three models 410, 420, and 430 are suitably trained in parallel. Each of the three models 410, 420, and 430 may be trained using the same plurality of historical images. The plurality of images are presented to the three models 410, 420, and 430 in the same order. In other embodiments, the plurality of images are presented in different orders. In the example embodiment, the three models 410, 420, and 430 are different starting models. The three models 410, 420, and 430 are suitably convolutional neural network models, such as, but not limited to, the EfficientNet models. The three models 410, 420, and 430 are different versions of the EfficientNet model, such as, but not limited to, B1, B2, and B3, respectively. In other embodiments, other types of models may be used with the systems described herein.

The APK detection computer device 108 suitably uses ensembling 440 to determine a final prediction 445. The ensembling 440 uses weights for the different predictions 415, 425, and 435, as shown in Equation 1.

$$\text{Final Prediction} = w1 * pred_1 + w2 * pred_2 + w3 * \text{pred\_3} \qquad \text{EQ. 1}$$

The APK detection computer device 108 calculates the weights for the predictions 415, 425, and 435 by means of a Bayesian approach and/or Bayesian optimization. The APK detection computer device 108 calculates the weights based, at least in part, upon the performance of the models 410, 420, and 430 with the validation set of images.

While the above systems and methods are described for detecting air pockets in silicon, ones having skill in the art would understand that the system and methods described herein may be used for other image classifications systems, including, but not limited to, metrology, flatness measurement, capacitance test, conductance test, and other image-based defect analysis.

Figure 5:
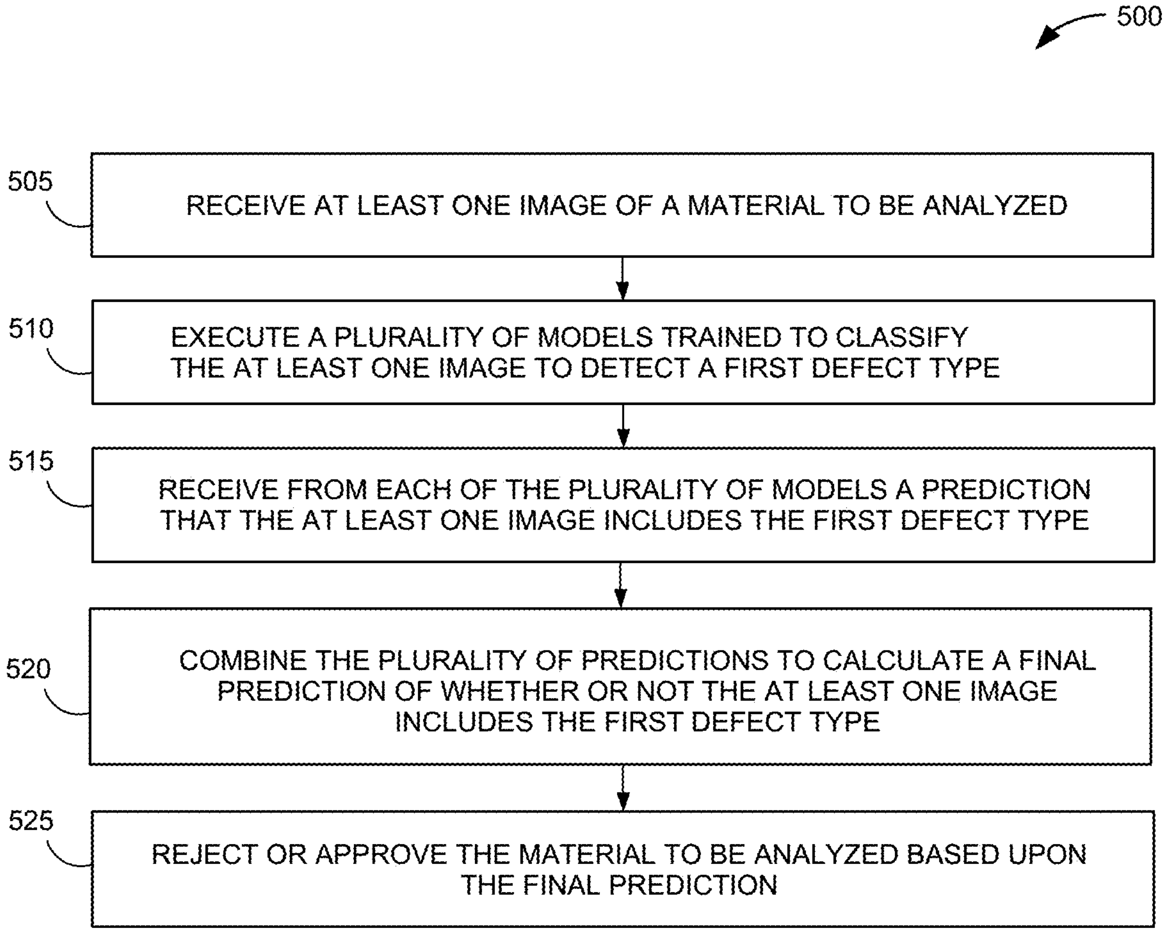
FIG. 5 illustrates an example process of analyzing for detecting air pockets using the system shown in FIG. 4.

FIG. 5 illustrates an example process 500 of analyzing for detecting air pockets using the system 100 (shown in FIG. 1). In this example, the process 500 is performed by the APK detection computer device 108 (shown in FIG. 1).

The APK detection computer device 108 receives 505 at least one image 405 (shown in FIG. 4) of a material 104 (shown in FIG. 1) to be analyzed. The material 104 is suitably a crystal formed by the Czochralski process. The material 104 may also be a silicon wafer. The at least one image 405 is suitably generated by an infrared radiation detection system as described in FIG. 1. In other embodiments, the at least one image 405 is generated by one of metrology, a flatness measurement, a capacitance test, a conductance test, and/or other defect analysis.

The APK detection computer device 108 executes 510 a plurality of models 410, 420, and 430 (shown in FIG. 4) trained to classify the at least one image 405 to detect a first defect type. The first defect type is an air pocket, or at least one air pocket in the material 104. However, other defect types may be detected using the systems and methods described. The plurality of models may include three different models, and the three different models are suitably convolution neural networks. The three different models may be Efficientnet models, such as, but not limited to, B1, B2, and B3, for example.

The APK detection computer device 108 receives 515 from each of the plurality of models 410, 420, and 430 a prediction 415, 425, and 435 (shown in FIG. 4) that the at least one image 405 includes the first defect type. The APK detection computer device 108 combines 520 the plurality of predictions 415, 425, and 435 to calculate a final prediction 445 (shown in FIG. 4) of whether or not the at least one image 405 includes the first defect type. The APK detection computer device 108 suitably calculates weights for combining the plurality of predictions 415, 425, and 435 using the validation of the second image training set. In other embodiments, the APK detection computer device 108 calculates the weights using Bayesian optimization.

The APK detection computer device 108 rejects or approves 525 the material 104 to be analyzed based upon the final prediction 445. In an enhancement, the APK detection computer device 108 trains the plurality of models using a first training image set. The APK detection computer device 108 validates the plurality of models using a second training set. The first image training set and the second image training set include different images.

While the above describes using the systems and processes for analyzing silicon made by a Cz process, the systems and processes may also be used for classifying other images and potential defects.

Figure 6:
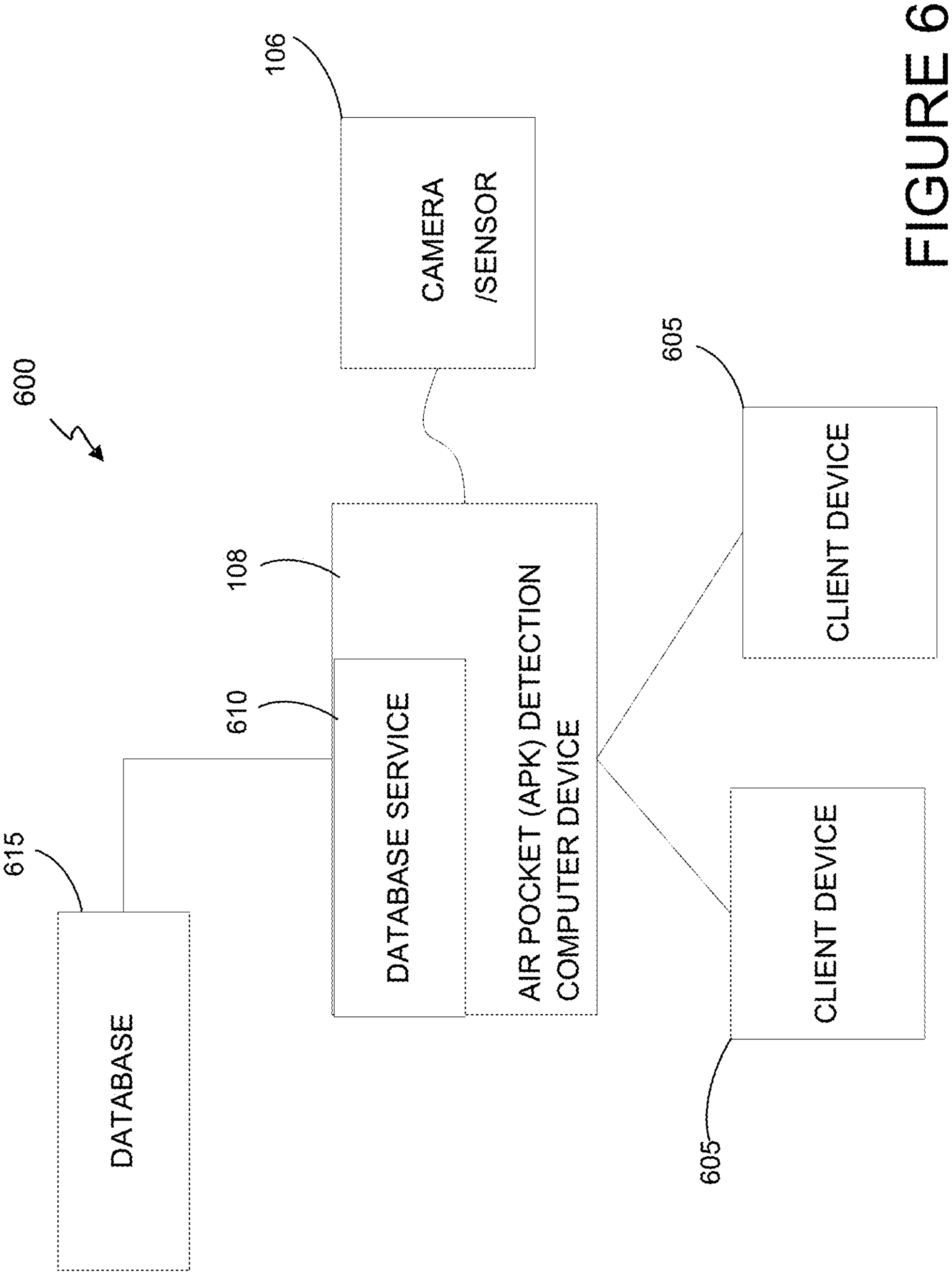
FIG. 6 illustrates an example system for performing the process shown in FIG. 5.

FIG. 6 illustrates an example system 600 for performing the process 500 (shown in FIG. 5). The system 600 is used for analyzing image data for air pockets. In addition, the system 600 may be used as an air pocket (APK) detection system configured to analyze images 405 (shown in FIG. 4) for air pockets and other defects.

As described above in more detail, the APK detection computer device 108 may be programmed to analyze images 405 to identify potential air pockets in material 104 (shown in FIG. 1) such as silicon wafers. In addition, the APK detection computer device 108 may be programmed to train a plurality of models 410, 420, and 430 (shown in FIG. 4) to be used in the analysis of images 405. The APK detection computer device 108 is suitably programmed to a) receive at least one image 405 of a material 104 to be analyzed: b) execute a plurality of models 410, 420, and 430 trained to classify the at least one image 405 to detect a first defect type: c) receive from each of the plurality of models 410, 420, and 430 a prediction that 415, 425, and 435 (shown in FIG. 4) the at least one image 405 includes the first defect type: d) combine the plurality of predictions 415, 425, and 435 to calculate a final prediction 445 (shown in FIG. 4) of whether or not the at least one image 405 includes the first defect type; and e) reject or approve the material 104 to be analyzed based upon the final prediction 445.

Example client devices 605 are computers that include a web browser or a software application, which enables client devices 605 to communicate with the APK detection computer device 108 using the Internet, a local area network (LAN), or a wide area network (WAN). In some embodiments, the client devices 605 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. Client devices 605 can be any device capable of accessing a network, such as the Internet, including, but not limited to, a desktop computer, a laptop computer, a personal digital assistant (PDA), a cellular phone, a smartphone, a tablet, a phablet, wearable electronics, smart watch, virtual headsets or glasses (e.g., AR (augmented reality), VR (virtual reality), or XR (extended reality) headsets or glasses), chat bots, voice bots, ChatGPT bots or ChatGPT-based bots, or other web-based connectable equipment or mobile devices.

An example APK detection computer device 108 (also known as APK detection server 108) is a computer that include a web browser or a software application, which enables APK detection computer device 108 to communicate with client devices 605 and cameras/sensors 106 using the Internet, a local area network (LAN), or a wide area network (WAN). In some embodiments, the APK detection computer device 108 is communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. The APK detection computer device 108 can be any device capable of accessing a network, such as the Internet, including, but not limited to, a desktop computer, a laptop computer, a personal digital assistant (PDA), a cellular phone, a smartphone, a tablet, a phablet, wearable electronics, smart watch, virtual headsets or glasses (e.g., AR (augmented reality), VR (virtual reality), or XR (extended reality) headsets or glasses), chat bots, voice bots, ChatGPT bots or ChatGPT-based bots, or other web-based connectable equipment or mobile devices.

A database server 610 is communicatively coupled to a database 615 that stores data. In one embodiment, the database 615 is a database that includes one or more analysis models and/or analysis information. In some embodiments, the database 615 is stored remotely from the APK detection computer device 108. In some embodiments, the database 615 is decentralized. In the example embodiment, a person can access the database 615 via the client devices 605 by logging onto the APK detection computer device 108.

Camera/sensor 106 may be any camera and/or sensor that the APK detection computer device 108 is in communication with that transmits images to the APK detection computer device 108. In the example embodiment, camera/sensors 106 that are in communication with APK detection computer device 108 using the Internet, a local area network (LAN), or a wide area network (WAN). In some embodiments, the camera/sensor(s) 106 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem.

Figure 7:
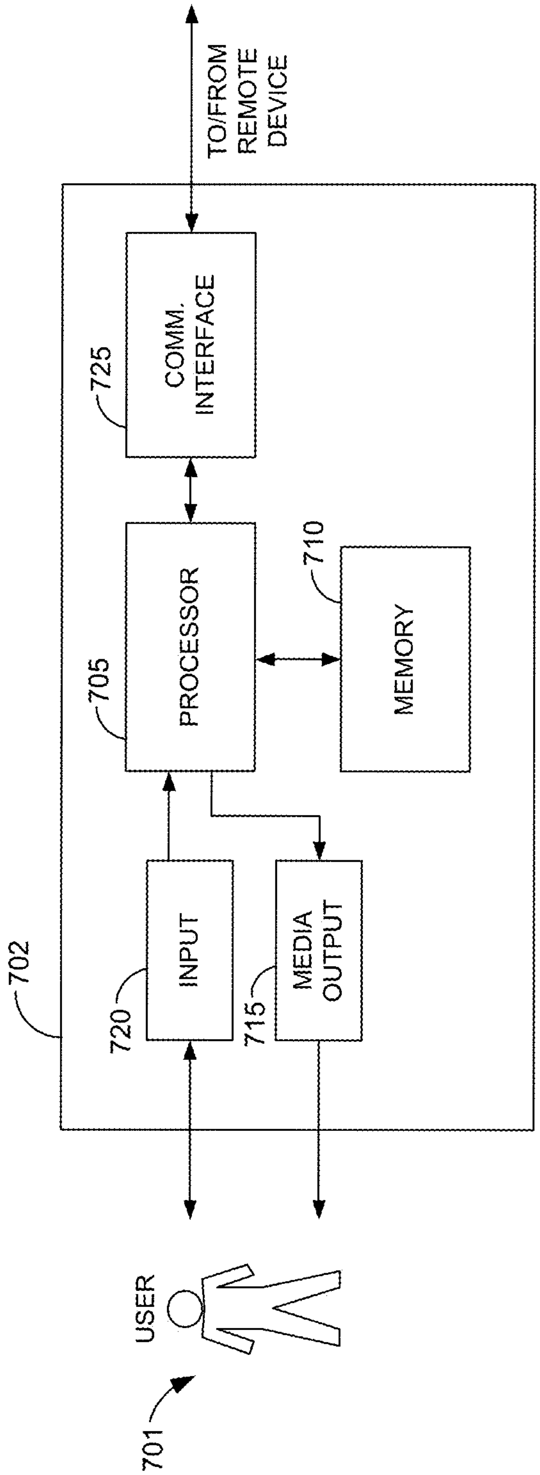
FIG. 7 illustrates an example configuration of a user computer device.

FIG. 7 depicts an example configuration 700 of user computer device 702. In the example embodiment, user computer device 702 may be similar to, or the same as, client device 605 (shown in FIG. 6). User computer device 702 may be operated by a user 701.

User computer device 702 may include a processor 705 for executing instructions. In some embodiments, executable instructions may be stored in a memory area 710. Processor 705 may include one or more processing units (e.g., in a multi-core configuration). Memory area 710 may be any device allowing information such as executable instructions and/or transaction data to be stored and retrieved. Memory area 710 may include one or more computer readable media.

User computer device 702 may also include at least one media output component 715 for presenting information to user 701. Media output component 715 may be any component capable of conveying information to user 701. In some embodiments, media output component 715 may include an output adapter (not shown) such as a video adapter and/or an audio adapter. An output adapter may be operatively coupled to processor 705 and operatively couplable to an output device such as a display device (e.g., a cathode ray tube (CRT), liquid crystal display (LCD), light emitting diode (LED) display, or "electronic ink" display) or an audio output device (e.g., a speaker or headphones).

Example media output component 715 may be configured to present a graphical user interface (e.g., a web browser and/or a client application) to user 701. A graphical user interface may include, for example, an interface for viewing items of information provided by the APK detection computer device 108 (shown in FIG. 1). In some embodiments, user computer device 702 may include an input device 720 for receiving input from user 701. User 701 may use input device 720 to, without limitation, submit information either through speech or typing.

Input device 720 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 715 and input device 720.

User computer device 702 may also include a communication interface 725, communicatively coupled to a remote device such as the APK detection computer device 108. Communication interface 725 may include, for example, a wired or wireless network adapter and/or a wireless data transceiver for use with a mobile telecommunications network.

Stored in memory area 710 are, for example, computer readable instructions for providing a user interface to user 701 via media output component 715 and, optionally, receiving and processing input from input device 720. A user interface may include, among other possibilities, a web browser and/or a client application. Web browsers enable users, such as user 701, to display and interact with media and other information typically embedded on a web page or a website from the APK detection computer device 108. A client application may allow user 701 to interact with, for example, the APK detection computer device 108. For example, instructions may be stored by a cloud service, and the output of the execution of the instructions sent to the media output component 715.

Figure 8:
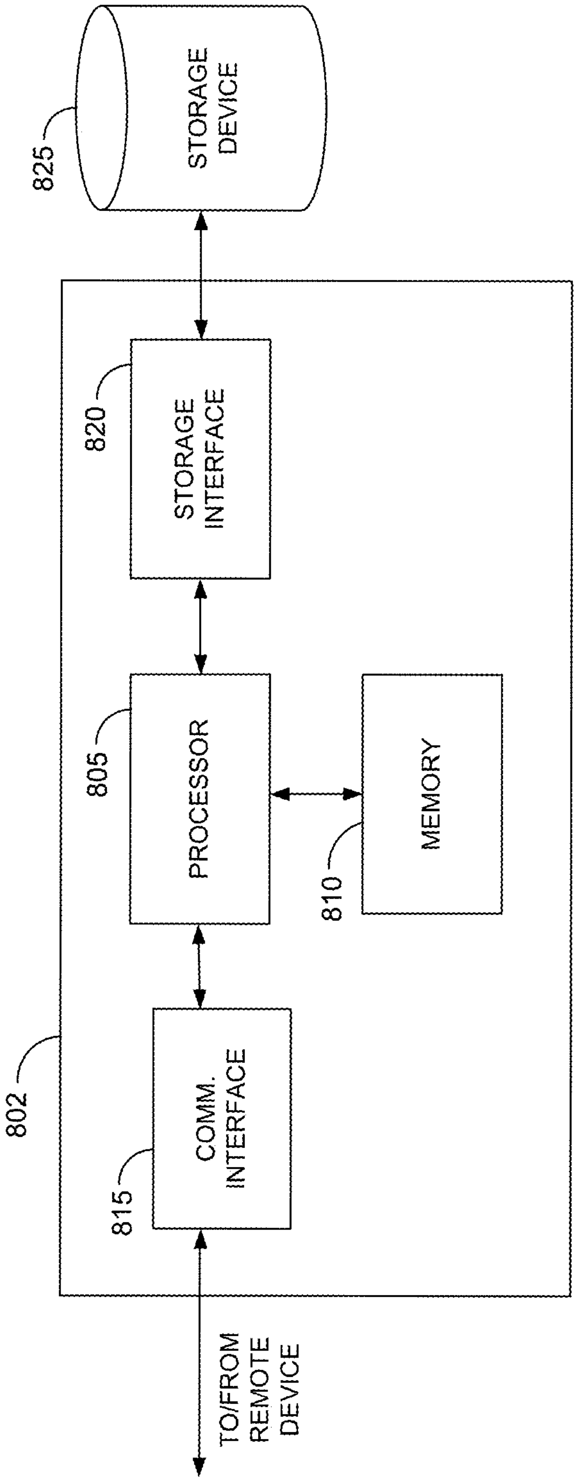
FIG. 8 illustrates an example configuration of a server computer device.

FIG. 8 depicts an example configuration 800 of a server computer device 802. In the example embodiment, server computer device 802 may be similar to, or the same as, the APK detection computer device 108 and database server 610 (both shown in FIG. 6). Server computer device 802 may also include a processor 805 for executing instructions. Instructions may be stored in a memory area 810. Processor 805 may include one or more processing units (e.g., in a multi-core configuration).

Processor 805 may be operatively coupled to a communication interface 815 such that server computer device 802 is capable of communicating with a remote device such as another server computer device 802, APK detection computer device 108, camera/sensors 106, and client devices 605 (shown in FIG. 6) (for example, using wireless communication or data transmission over one or more radio links or digital communication channels). For example, communication interface 815 may receive input from client devices 605 via the Internet, as illustrated in FIG. 6.

Processor 805 may also be operatively coupled to a storage device 825. Storage device 825 may be any computer-operated hardware suitable for storing and/or retrieving data, such as, but not limited to, data associated with one or more models. In some embodiments, storage device 825 may be integrated in server computer device 802. For example, server computer device 802 may include one or more hard disk drives as storage device 825.

In other embodiments, storage device 825 may be external to server computer device 802 and may be accessed by a plurality of server computer devices 802. For example, storage device 825 may include a storage area network (SAN), a network attached storage (NAS) system, and/or multiple storage units such as hard disks and/or solid-state disks in a redundant array of inexpensive disks (RAID) configuration.

In some embodiments, processor 805 may be operatively coupled to storage device 825 via a storage interface 820. Storage interface 820 may be any component capable of providing processor 805 with access to storage device 825. Storage interface 820 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 805 with access to storage device 825.

Processor 805 may execute computer-executable instructions for implementing aspects of the disclosure. In some embodiments, the processor 805 may be transformed into a special purpose microprocessor by executing computer-executable instructions or by otherwise being programmed. For example, the processor 805 may be programmed with the instructions such as illustrated in FIG. 5.

At least one of the technical problems addressed by this system may include: (i) improve analysis of wafers: (ii) decreased loss of material due to misclassification; and/or (iii) increased accuracy in wafer analysis.

A technical effect of the systems and processes described herein may be achieved by performing at least one of the following steps: (i) receive at least one image of a material to be analyzed: (ii) execute a plurality of models trained to classify the at least one image to detect a first defect type: (iii) receive from each of the plurality of models a prediction that the at least one image includes the first defect type: (iv) combine the plurality of predictions to calculate a final prediction of whether or not the at least one image includes the first defect type; and (v) reject or approve the material to be analyzed based upon the final prediction.

Machine Learning and Other Matters

Example APK detection computer device 108 is configured to implement machine learning, such that the APK detection computer device 108 "learns" to analyze, organize, and/or process data without being explicitly programmed. Machine learning may be implemented through machine learning methods and algorithms ("ML methods and algorithms"). In an example embodiment, a machine learning module ("ML module") is configured to implement ML methods and algorithms. In some embodiments, ML methods and algorithms are applied to data inputs and generate machine learning outputs ("ML outputs"). Data inputs may include but are not limited to images. ML outputs may include, but are not limited to identified objects, items classifications, and/or other data extracted from the images. In some embodiments, data inputs may include certain ML outputs.

At least one of a plurality of ML methods and algorithms may be applied, which may include but are not limited to: linear or logistic regression, instance-based algorithms, regularization algorithms, decision trees, Bayesian networks, cluster analysis, association rule learning, artificial neural networks, deep learning, combined learning, reinforced learning, dimensionality reduction, and support vector machines. In various embodiments, the implemented ML methods and algorithms are directed toward at least one of a plurality of categorizations of machine learning, such as supervised learning, unsupervised learning, and reinforcement learning.

The example ML module employs supervised learning, which involves identifying patterns in existing data to make predictions about subsequently received data. Specifically, the ML module is "trained" using training data, which includes example inputs and associated example outputs. Based upon the training data, the ML module may generate a predictive function which maps outputs to inputs and may utilize the predictive function to generate ML outputs based upon data inputs. The example inputs and example outputs of the training data may include any of the data inputs or ML outputs described above. In the example embodiment, a processing element may be trained by providing it with a large sample of images with known characteristics or features. Such information may include, for example, information associated with a plurality of images of a plurality of different objects, items, and/or faults.

In another embodiment, an ML module employs unsupervised learning, which involves finding meaningful relationships in unorganized data. Unlike supervised learning, unsupervised learning does not involve user-initiated training based upon example inputs with associated outputs. Rather, in unsupervised learning, the ML module may organize unlabeled data according to a relationship determined by at least one ML method/algorithm employed by the ML module. Unorganized data may include any combination of data inputs and/or ML outputs as described above.

In yet another embodiment, a ML module may employ reinforcement learning, which involves optimizing outputs based upon feedback from a reward signal. Specifically, the ML module may receive a user-defined reward signal definition, receive a data input, utilize a decision-making model to generate a ML output based upon the data input, receive a reward signal based upon the reward signal definition and the ML output, and alter the decision-making model so as to receive a stronger reward signal for subsequently generated ML outputs. Other types of machine learning may also be employed, including deep or combined learning techniques.

Based upon these analyses, the processing element may learn how to identify characteristics and patterns that may then be applied to analyzing and classifying objects. This information may be used to determine which classification models to use and which classifications to provide.

Additional Considerations

Example systems are operable to detect light passing through a single crystal material, such as a single crystal sample, and process the image data based on the detected light to determine if an air pocket is present within the material. Generally, air pocket anomalies (e.g., voids) define substantially regular and circular shapes, while non-air pocket anomalies deviate from a circular shape.

Some prior defect detection systems are based on primitive shape algorithms. Embodiments of the present disclosure improve on these prior systems by improving the classification of real air pockets, including pin holes versus particles or other surface defects with regular shape. The improved classification enables improved yield and prevents potentially incorrect or misleading feedback to the crystal pulling process enabling accurate decision-making process. Moreover, enhancing the classification process improves the identification real defects leading to better wafer quality. Consequently, this improvement contributes to increased customer satisfaction. Finally, in cases where sampling inspections are employed, the improved classification increases the capacity of measurement tool by reducing the occurrence of false alarms or misclassifications.

Example detection of defect systems illuminate wafers by an infrared radiation (IR) and collect signal by high resolution CCD (couple-charged device) cameras. The images are analyzed and air pockets are screened among all defects. Examples system uses a deep learning approach to APK defect classification. This system uses end-to-end learned classification to obtain improvement over an IR tool baseline.

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

As will be appreciated based upon this specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps," or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

The term "database" can refer to either a body of data, a relational database management system (RDBMS), or to both. As used herein, a database can include any collection of data including hierarchical databases, relational databases, flat file databases, object-relational databases, object-oriented databases, and any other structured collection of records or data that is stored in a computer system. The above examples are example only, and thus are not intended to limit in any way the definition and/or meaning of the term database. Examples of RDBMS' include, but are not limited to including, Oracle® Database, MySQL, IBM® DB2, Microsoft® SQL Server, Sybase®), and PostgreSQL. However, any database can be used that enables the systems and methods described herein. (Oracle is a registered trademark of Oracle Corporation, Redwood Shores, California: IBM is a registered trademark of International Business Machines Corporation, Armonk, New York: Microsoft is a registered trademark of Microsoft Corporation, Redmond, Washington; and Sybase is a registered trademark of Sybase, Dublin, California.)

A processor may include any programmable system including systems using micro-controllers, reduced instruction set circuits (RISC), application specific integrated circuits (ASICs), logic circuits, and any other circuit or processor capable of executing the functions described herein. The above examples are example only and are thus not intended to limit in any way the definition and/or meaning of the term "processor."

As used herein, the terms "software" and "firmware" are interchangeable and include any computer program stored in memory for execution by a processor, including RAM memory, ROM memory, EPROM memory, EEPROM memory, and non-volatile RAM (NVRAM) memory. The above memory types are example only and are thus not limiting as to the types of memory usable for storage of a computer program.

In another example, a computer program is provided, and the program is embodied on a computer-readable medium. In an example, the system is executed on a single computer system, without requiring a connection to a server computer. In a further example, the system is being run in a Windows® environment (Windows is a registered trademark of Microsoft Corporation, Redmond, Washington). In yet another example, the system is run on a mainframe environment and a UNIX® server environment (UNIX is a registered trademark of X/Open Company Limited located in Reading, Berkshire, United Kingdom). In a further example, the system is run on an iOS® environment (iOS is a registered trademark of Cisco Systems, Inc. located in San Jose, CA). In yet a further example, the system is run on a Mac OS® environment (Mac OS is a registered trademark of Apple Inc. located in Cupertino, CA). In still yet a further example, the system is run on Android® OS (Android is a registered trademark of Google, Inc. of Mountain View, CA). In another example, the system is run on Linux® OS (Linux is a registered trademark of Linus Torvalds of Boston, MA). The application is flexible and designed to run in various different environments without compromising any major functionality.

The system may include multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

An element or step recited in the singular and proceeded with the word “a” or “an” should be understood as not excluding plural elements or steps, unless such exclusion is explicitly recited. Furthermore, references to “example” or “one example” of the present disclosure are not intended to be interpreted as excluding the existence of additional examples that also incorporate the recited features. Further, to the extent that terms “includes,” “including,” “has,” “contains,” and variants thereof are used herein, such terms are intended to be inclusive in a manner similar to the term “comprises” as an open transition word without precluding any additional or other elements.

Furthermore, the term “real-time” refers to at least one of the time of occurrence of the associated events, the time of measurement and collection of predetermined data, the time to process the data, and the time of a system response to the events and the environment. In the examples described, these activities and events occur substantially instantaneously.

The claims are not intended to be construed under 35 U.S.C. § 112(*f*) unless traditional means-plus-function language is expressly recited, such as “means for” or “step for” language being expressly recited in the claim(s). This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer device comprising at least one processor in communication with at least one memory device, wherein the at least one processor programmed to:

receive at least one image of a material to be analyzed;

execute a plurality of models trained to classify the at least one image to detect a first defect type;

receive from each of the plurality of models a prediction that the at least one image includes the first defect type;

apply a weight of a plurality of weights to each of the plurality of predictions, wherein each weight of the plurality of weights is calculated based on i) past performance of the corresponding model of the plurality of models that generated the prediction and ii) Bayesian optimization;

combine the plurality of predictions with their corresponding weights to calculate a final prediction of whether or not the at least one image includes the first defect type; and reject or approve the material to be analyzed based upon the final prediction.

2. The computer device of claim 1, wherein the material is a single crystal formed by the Czochralski process.

3. The computer device of claim 1, wherein the material is a silicon wafer.

4. The computer device of claim 1, wherein the material is a semiconductor material.

5. The computer device of claim 1, wherein the at least one image was generated by an infrared radiation detection system.

6. The computer device of claim 1, wherein the at least one image is generated by one of metrology, a flatness measurement, a capacitance test, and a conductance test.

7. The computer device of claim 1, wherein the first defect type is at least one air pocket in the material.

8. The computer device of claim 1, wherein the at least one processor is further programmed to:

train the plurality of models using a first image training set; and validate the plurality of models using a second image training set.

9. The computer device of claim 8, wherein the at least one processor is further programmed to calculate the plurality of weights for combining the plurality of predictions using the validation of the second image training set.

10. The computer device of claim 1, wherein the plurality of models include three different models.

11. The computer device of claim 10, wherein the three different models are convolution neural networks.

12. The computer device of claim 11, wherein the three different models are Efficientnet models.

13. A computer-implemented method performed by a computer system including at least one processor in communication with at least one memory device, the method comprising:

receiving at least one image of a material to be analyzed;

executing a plurality of models trained to classify the at least one image to detect a first defect type;

receiving from each of the plurality of models a prediction that the at least one image includes the first defect type;

applying a weight of a plurality of weights to each of the plurality of predictions, wherein each weight of the plurality of weights is calculated based on; i) past performance of the corresponding model of the plurality of models that generated the prediction and ii) Bayesian optimization;

combining the plurality of predictions with their corresponding weights to calculate a final prediction of whether or not the at least one image includes the first defect type; and rejecting or approving the material to be analyzed based upon the final prediction.

14. The computer-implemented method of claim 13, wherein the material is a silicon wafer.

15. The computer-implemented method of claim 13, wherein the at least one image was generated by an infrared radiation detection system.

16. The computer-implemented method of claim 13, wherein the first defect type is at least one air pocket in the material.

17. The computer-implemented method of claim 13 further comprising:

training the plurality of models using a first image training set; and validating the plurality of models using a second image training set.

18. The computer-implemented method of claim 17 further comprising calculating the plurality of weights for combining the plurality of predictions using the validation of the second image training set and Bayesian optimization.

19. The computer device of claim 1, wherein the material to be analyzed is positioned between a light source and a capture device, where the capture device captures the at least one image of the material to be analyzed, and wherein the light source produces light having a wavelength sufficient to penetrate the material to be analyzed based on a thickness of the material to be analyzed.

20. The computer-implemented method of claim 13, wherein the material to be analyzed is positioned between a light source and a capture device, where the capture device captures the at least one image of the material to be analyzed, and wherein the light source produces light having a wavelength sufficient to penetrate the material to be analyzed based on a thickness of the material to be analyzed.

* * * * *